United States Patent
Hamzy et al.

(10) Patent No.: US 7,490,340 B2
(45) Date of Patent: Feb. 10, 2009

(54) SELECTIVELY DE-SCRAMBLING MEDIA SIGNALS

(75) Inventors: Mark Joseph Hamzy, Round Rock, TX (US); Scott Thomas Jones, Austin, TX (US); Peter A. Zannucci, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 10/422,647

(22) Filed: Apr. 21, 2003

(65) Prior Publication Data

US 2004/0210928 A1 Oct. 21, 2004

(51) Int. Cl.
*H04N 7/16* (2006.01)
*H04N 7/167* (2006.01)

(52) U.S. Cl. .................. 725/25; 348/156; 348/211.4; 348/474; 455/26.1

(58) Field of Classification Search .................. 725/25, 725/28, 31; 380/211; 348/156, 211.4, 474; 455/26.1
See application file for complete search history.

(56) References Cited

U.S. PATENT DOCUMENTS

| 3,919,462 | A | * | 11/1975 | Hartung et al. | 380/235 |
| 4,554,584 | A | * | 11/1985 | Elam et al. | 725/28 |
| 5,382,983 | A | * | 1/1995 | Kwoh et al. | 348/716 |
| 5,606,612 | A | * | 2/1997 | Griffin et al. | 380/217 |
| 6,944,876 | B1 | * | 9/2005 | Whitelaw | 725/25 |
| 2002/0013941 | A1 | * | 1/2002 | Ward et al. | 725/25 |
| 2002/0095673 | A1 | * | 7/2002 | Leung et al. | 725/25 |

* cited by examiner

*Primary Examiner*—Vivek Srivastava
*Assistant Examiner*—Paul J Graham
(74) *Attorney, Agent, or Firm*—Van Leeuwen & Van Leeuwen; Diana R. Gerhardt

(57) ABSTRACT

A user enters control settings into a content receiver whereby the control settings correspond to a particular viewer or a particular time-of-day. The content receiver receives a media signal and metadata that includes censorship level information. The content receiver uses the control settings to identify an applicable censorship level and uses the metadata to de-scramble the media signal to a censorship level corresponding to the identified applicable censorship level. The content receiver provides the de-scrambled media signal to a viewer's display.

2 Claims, 7 Drawing Sheets

SELECTIVELY DE-SCRAMBLING MEDIA SIGNALS

BACKGROUND OF THE INVENTION

1. Technical Field

The present invention relates in general to a system and method for selectively de-scrambling media signals. More particularly, the present invention relates to a system and method for using metadata to de-scramble a media signal in order to decrease the media signal's censorship level corresponding to control settings.

2. Description of the Related Art

The public has debated the issue of content censorship for many years. The debate typically challenges first amendment rights (e.g. free speech) against a moral obligation as to what is considered "appropriate" for various age groups. The Motion Picture Association of America (MPAA) developed a rating system for motion pictures which provides parental guidance as well as viewing audience regulation. For example, a parent may decide to allow their child to attend a "G" rated movie, but not allow their child to attend a "PG" rated movie. In another example, a movie theater is regulated to not admit a person under the age of 17 into an "R" rated movie unless accompanied by an adult. The Federal Communications Commission (FCC) has recently developed a similar rating system for television programs. The television rating system has six ratings which range from TV-Y (suitable for everyone) to TV-MA (suitable for mature audiences).

Content providers in the television industry are starting to accept the television rating system and are providing content with particular ratings. Content providers, however, typically provide content type based upon the content provider's viewing audience. For example, a content provider understands that young children are watching television during morning hours and the content providers provide some content in the morning suitable for children (i.e. a children's program). This approach provides a certain level of censorship in that it is unlikely that a television station shows a program that is rated "TV-MA" in the morning. A challenge found, however, is for content providers to identify and provide content with an acceptable censorship level during times when the content provider's viewing audience encompasses a wider range of viewers, such as in the afternoon or evening.

In addition, some viewers may wish to view uncensored content during the day. For example, a viewer may not have children and may wish to view uncensored content at any time. A challenge found, however, is that content providers censor content at a higher level during the day due to the content provider's daytime viewing audience.

What is needed, therefore, is a method for providing a viewer the ability to adjust a content's censorship level based upon the viewer's preferences.

SUMMARY

It has been discovered that the aforementioned challenges are resolved by using metadata to de-scramble a media signal at a viewer's location based upon a user's control settings. A user configures control settings which are stored in a content receiver. The content receiver uses the control settings to identify an applicable censorship level to de-scramble content. The content receiver receives a media signal and compares the media signal's censorship level rating with the identified applicable censorship level. The content receiver uses the metadata to de-scramble portions of the media signal in order to generate a formatted signal that corresponds to the identified applicable censorship level rating.

A user enters control settings into a content receiver as well as choosing whether to have the content receiver censor media signals based upon a viewer or based upon a time-of-day. For example, the user (i.e. parent) may configure the content receiver to provide "TV-G" rated media signals during the daytime and provide "TV-14" rated media signals during the evening. In another example, the user may configure the content receiver to provide "TV-G" rated media signals when his five year old is watching television and provide "TV-PG" rated media signals when his teenager is watching television.

A content provider provides a media signal and corresponding metadata to the content receiver. Segments of the media signal are scrambled (i.e. censored) and the metadata includes censorship data, such as video and audio location information, corresponding to the scrambled segments. The content provider may be a company such as a local television station, a cable television network, or a satellite television company. For example, the censorship data may coincide with a television rating system which includes rating levels TV-Y, TV-Y7, TV-G, TV-PG, TV-14, and TV-MA. In one embodiment, the content receiver may receive the metadata from a source different than the content provider (i.e. an Internet metadata provider).

The content receiver compares the media signal's censorship rating with an identified applicable censorship level to determine whether segments of the media signal require de-scrambling. If de-scrambling is required, the content receiver uses video and audio location information corresponding to the applicable censorship level to de-scramble the media signal. The content receiver provides the de-scrambled signal to a viewer's display, such as a television.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
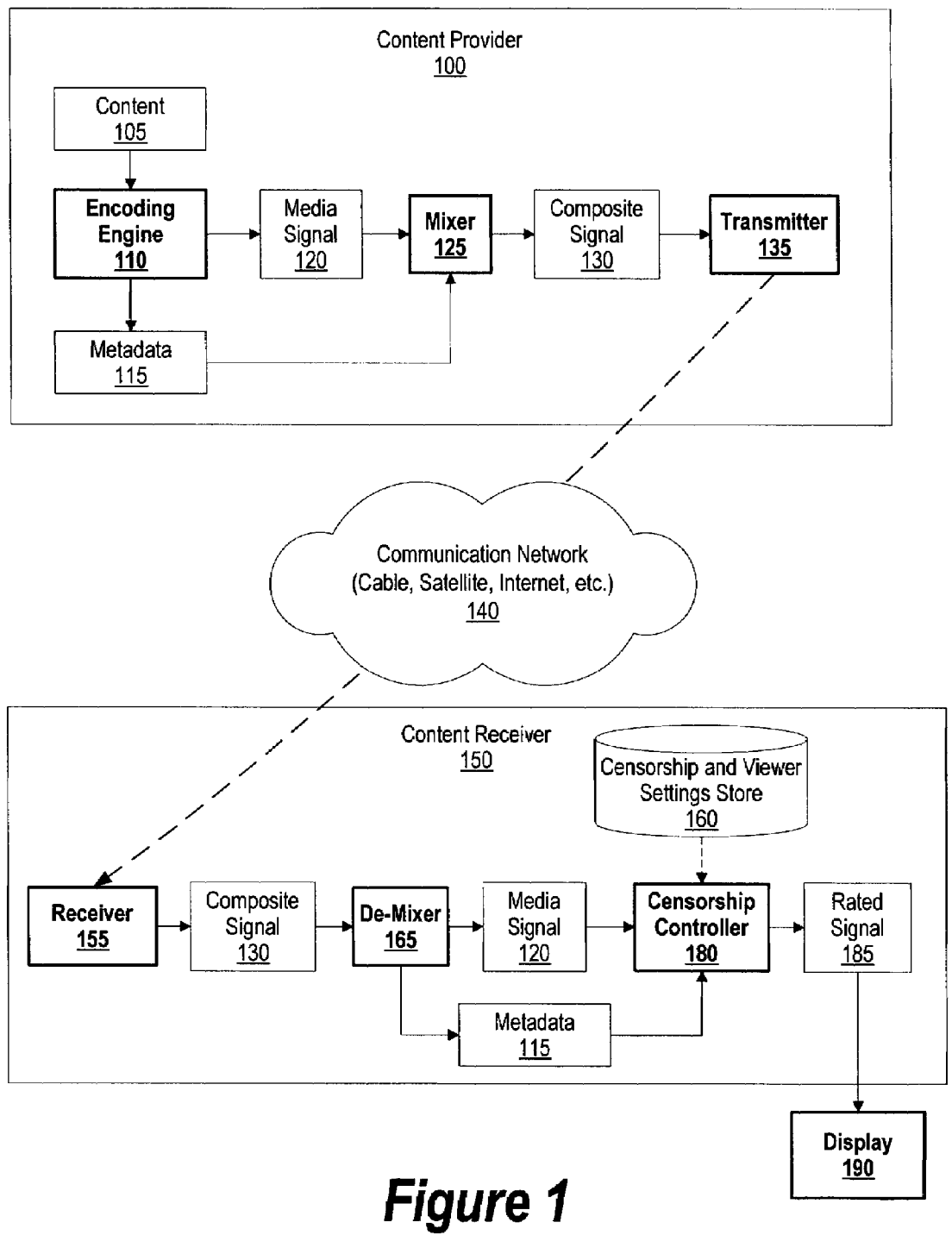
FIG. 1 is a diagram showing a content provider providing a media signal to a content receiver and the content receiver processing the media signal.

FIG. 1 is a diagram showing a content provider providing a media signal to a content receiver and the content receiver processing the media signal. Content provider 100 provides content to viewers that meet a particular censorship rating level. For example, content provider may be a television station and media signal 120 is rated based upon a television rating system which includes censorship ratings of TV-Y, TV-Y7, TV-G, TV-PG, TV-14, or TV-MA.

Content providers may censor content in order for the content to meet a particular censorship rating level. Using the example described above, a television station may censor a reality television show in order to meet a censorship rating level that makes the content suitable for television viewing. In this example, content 105 corresponds to the uncensored reality television show and media signal 120 corresponds to the censored reality show.

Content provider 100 uses encoding engine 110 to scramble (i.e. censor) various segments of content 105 during a content censorship process. For example, content 105 may include "inappropriate" language during various times and encoding engine 110 "bleeps-out" the inappropriate language. Encoding engine 110 may censor content 105 using a scrambling mechanism such as an exclusive-OR of portions of an image frame or use a rotation cipher such as ROT128 or other more complicated reversible encodings. Encoding engine 110 generates metadata 115 that includes locations corresponding to censored content. For example, metadata may include pixel locations that have been scrambled in order to have content 105 meet a particular censorship level rating (see FIG. 4B and corresponding text for further details regarding metadata properties). Metadata 115 corresponds to a segment of content 105 whereby each segment may correspond to a single frame (i.e. snapshot) or may correspond to a plurality of frames, such as when a video portion is being "covered" (i.e. five seconds worth of content 105).

Content provider 100 uses mixer 125 to combine media signal 120 with metadata 115 which creates composite signal 130. Mixer 125 may use standard signal combination techniques to combine signals and may include different carrier frequencies in order to combine metadata 115 and media signal 120. Content provider 100 uses transmitter 135 to send composite signal 130 to content receiver 150 over communication network 140, such as a cable television infrastructure. For example, transmitter 130 may be a transmitter capable of transmitting a cable television signal. Content receiver 150 is a device located at a viewer's location. For example,-content receiver may be a set-top box located in a viewer's living room.

Content receiver 150 uses receiver 155 to receive composite signal 130. For example, receiver 155 may be a receiver capable of receiving a cable television signal. Content receiver 150 uses de-mixer 165 to separate media signal 120 and metadata 115. De-mixer 165 uses standard signal separation techniques corresponding to mixer 125's signal combination techniques. Censorship controller 180 retrieves control settings from data store 160 and identifies an applicable censorship level. As one skilled in the art can appreciate, control settings are censorship control settings that may not necessarily be set by a parent but may also be set by a business owner who wishes to control a censorship level corresponding to media that displayed at his business location. Data store 160 may be stored on a nonvolatile storage area, such as a computer hard drive or nonvolatile memory accessible from content receiver 150. Censorship controller 180 determines whether media signal 120 requires modification by comparing media signal 120's censorship rating level with the applicable censorship level (see FIGS. 4A, 5, 6, and corresponding text for further details regarding applicable censorship level selection).

Censorship controller 180 uses metadata 115 to de-scramble media signal 120 using a de-scrambling mechanism corresponding to the scrambling mechanism used by encoding engine 110. Censorship controller 180 generates de-scrambled signal 185 (rated signal) that meets the applicable censorship level. Content receiver 150 sends rated signal 185 to display 190 for viewing.

In one embodiment, a content provider may provide uncensored content and corresponding metadata whereby a content receiver is able to scramble the uncensored content to an acceptable censorship level. For example, a content provider may provide a television program with no audio "bleeps" and no video "covers" and the content receiver uses the metadata provided to "bleep" audio portions and "cover" video portions in order to format the television program to a "TV-G" rating.

In another embodiment, a content receiver may receive metadata from a third party vendor over a computer network, such as the Internet. In this embodiment, the content receiver receives a media signal from the content provider and uses metadata received from the third party vendor to scramble or de-scramble the media signal.

Figure 2:
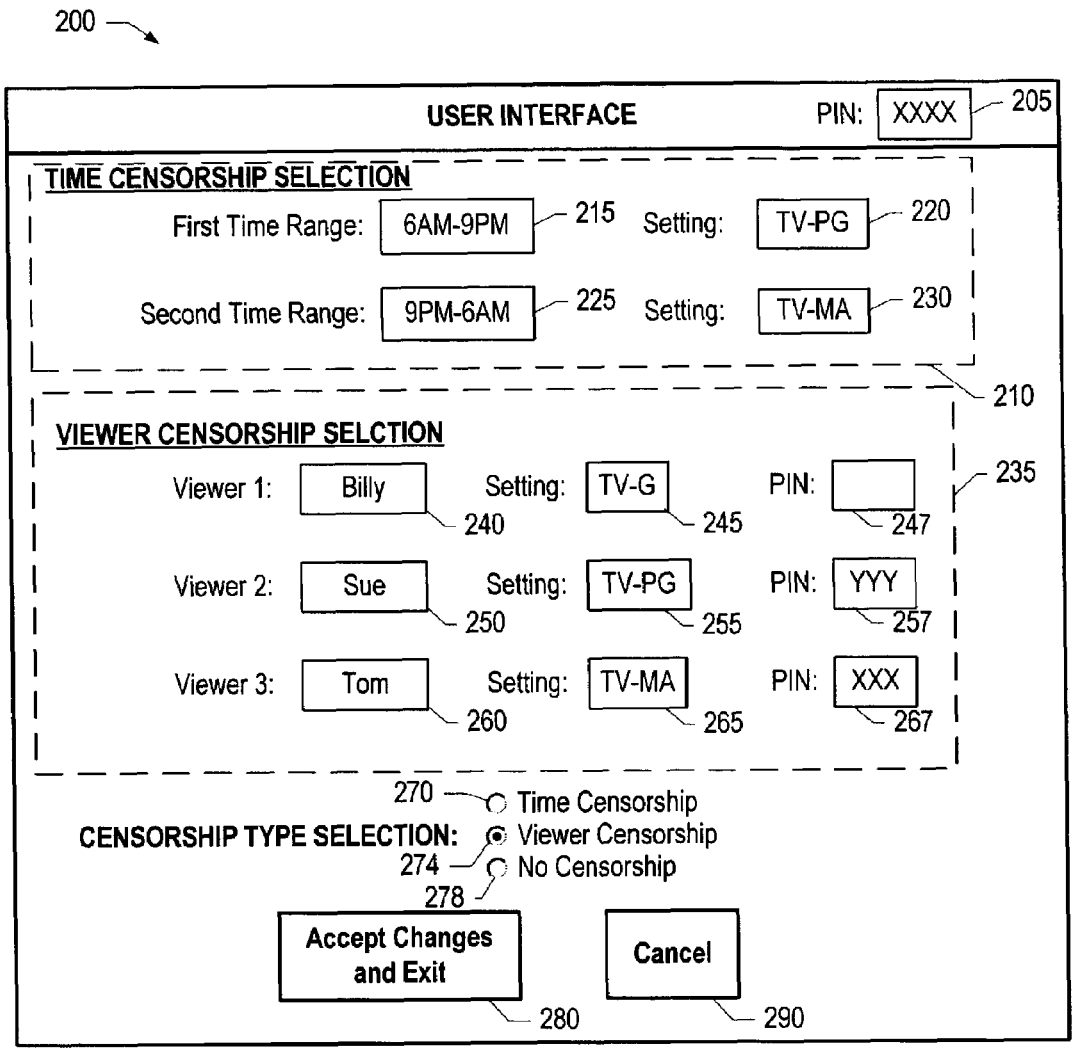
FIG. 2 is a user interface window showing control settings.

FIG. 2 shows a user interface window that includes control settings. Processing displays window 200 when a user wishes to view or modify control settings. For example, a parent may use a remote control to instruct a content receiver to display window 200 on a television. Window 200 includes text box 205 which displays a stored personal identification number (PIN) that a requesting user may be required to match prior to window 200 being displayed. Using the example described above, the parent is prompted to enter his PIN number and the content receiver compares the entered PIN with the stored PIN in order to determine if the user entered the correct PIN. Once the user is validated and window 200 is displayed, the user may change the stored PIN by entering a new PIN in text box 205 (see FIG. 3 and corresponding text for further details regarding user authentication).

Window 200 includes two censorship type selections which are time censorship selection 210 and viewer censorship selection 235. A user uses time censorship selection 210 when the user wishes to censor media signals based upon a time-of-day. For example, a parent may wish to configure a content receiver to show "TV-G" rated media signals while his children are awake, and show "TV-MA" rated media signals while his children are asleep. Time censorship selection 210 includes a first time range and a second time range. A user enters a first time range in text box 215 and enters a corresponding censorship level in text box 220. The example in FIG. 2 shows that a user's first time range is from "6 AM-9 PM" and the corresponding censorship level is "TV-PG".

A user enters a second time range in text box 225 and enters a corresponding censorship level in text box 230. The example in FIG. 2 shows that a user's second time range is from "9 PM-6 AM" and the corresponding censorship level is "TV-MA". In one embodiment, a user may continue to add more time ranges in order to configure his time censorship selection in finer detail, such as on an hourly basis.

A user uses viewer censorship selection 235 when the user wishes to censor media signals based upon which viewer is watching a particular media signal. For example, a parent may configure a content receiver to show "TV-G" rated media signals to his five-year-old child and show "TV-PG" rated media signals to his teenager. The example in FIG. 2 shows censorship settings for three viewers. A user enters the name of a first viewer in text box 240 and enters the first viewer's corresponding censorship level in text box 245. The example in FIG. 2 shows that the first viewer is "Billy" and Billy's corresponding censorship level is "TV-G". A user enters the name of a second viewer in text box 250 and enters the second viewer's corresponding censorship level in text box 255. The example in FIG. 2 shows that the second viewer is "Sue" and Sue's corresponding censorship level is "TV-PG". A user enters the name of a third viewer in text box 260 and enters the third viewer's corresponding censorship level in text box 265. The example in FIG. 2 shows that the third viewer is "Tom" and Tom's corresponding censorship level is "TV-MA". In one embodiment, a user may continue to add more viewers in order to configure his viewer censorship selection corresponding to a particular number of people, such as the number of people in the user's family.

The user selects radio button 270, 274, or 278 to instruct processing as to what censorship type to use. The user selects radio button 270 in order to instruct processing to use "time censorship". The user selects radio button 274 in order to instruct processing to use "viewer censorship". Or, the user selects radio button 278 in order to instruct processing not to use a censorship type and display a media signal "as-is". The example in FIG. 2 shows that the user instructs processing to use "Viewer" censorship settings as control settings when processing a media signal. Once a user is finished entering censorship level setting changes, the user selects command button 280 whereby processing saves the censorship level setting changes. If the user does not wish to have processing save the censorship level setting changes, the user selects command button 290 whereby processing disregards the censorship level setting changes.

In one embodiment, window 200 may have a "customer" area whereby the customer area includes a location for a user to enter a user identifier and a password. In this embodiment, the content receiver de-scrambles a media signal if the user enters the correct user identifier and password. In this embodiment, content providers may control media signal de-scrambling by providing a password based upon viewer criteria. For example, a content provider may provide a password for authorized pay-per-view customers or a school may provide a password to a student to view answers on an instructional tape after the student has attended a class.

In another embodiment, window 200 includes a video scrambling option whereby a user selects the color of a box to cover a scrambled area so that the user does not view scrambled video. In this embodiment, window 200 may include an audio scrambling option whereby a user selects a particular sound for a content receiver to use for scrambled audio, such as a beep.

Figure 3:
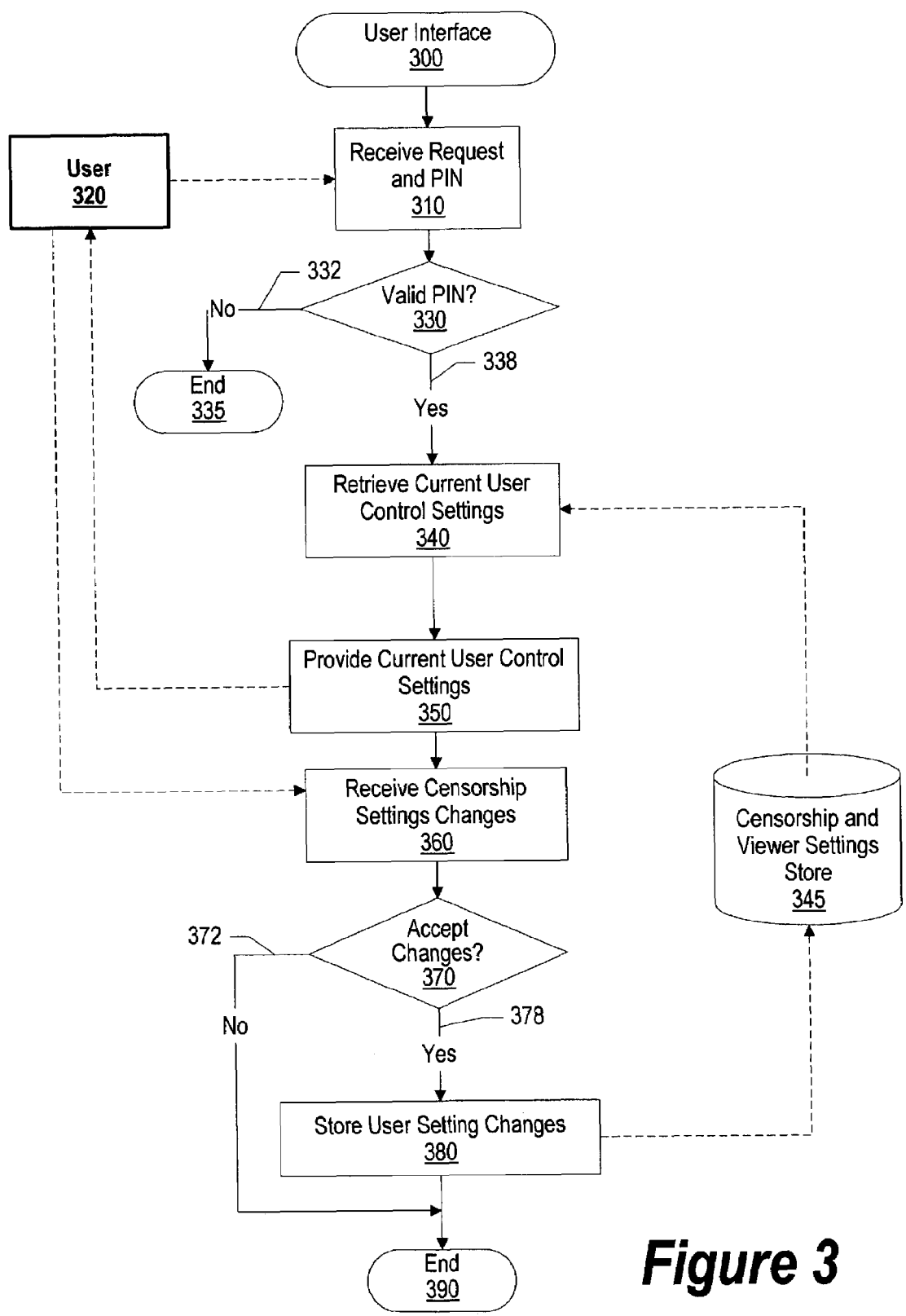
FIG. 3 is a flowchart showing steps taken in receiving changes to control settings.

FIG. 3 is a flowchart showing steps taken in receiving changes to control settings from a user. Processing commences at 300, whereupon processing receives a request and a personal identification number (PIN) from user 320 (step 310). For example, user 320 may be a parent who wishes to configure censorship level settings for his children and uses his remote control to enter the request and the PIN.

A determination is made as to whether user 320 provided a valid PIN (decision 330) by comparing the PIN received from user 320 with a stored PIN (see FIG. 2 and corresponding text for further details regarding stored PIN's). If user 320 did not provide a valid PIN, decision 330 branches to "No" branch 332 whereupon processing ends at 335. For example, a child may enter an invalid PIN while attempting to change censorship level settings that his parent configured.

On the other hand, if user 320 entered a valid PIN, decision 330 branches to "Yes" branch 338 whereupon processing retrieves stored control settings from data store 345 (step 340). Data store 345 may be stored on a non-volatile storage area, such as a computer hard drive. Processing displays a user interface window to user 320 at step 350 which includes the stored control settings (see FIG. 2 and corresponding text for further details regarding user interface window properties).

User 320 enters censorship level setting changes using a device (i.e. remote control) and processing receives the censorship level setting changes at step 360 (see FIG. 2 and corresponding text for further details regarding censorship level settings). A determination is made as to whether user 320 wishes to save the censorship level setting changes (decision 370). If user 320 wishes to save the censorship level setting changes, decision 370 branches to "Yes" branch 378 whereupon processing stores the censorship level setting changes in data store 345 (step 380).

On the other hand, if the user does not wish to save censorship level setting changes, decision 370 branches to "No" branch 372 bypassing censorship level saving steps. Processing ends at 390.

Figure 4A:
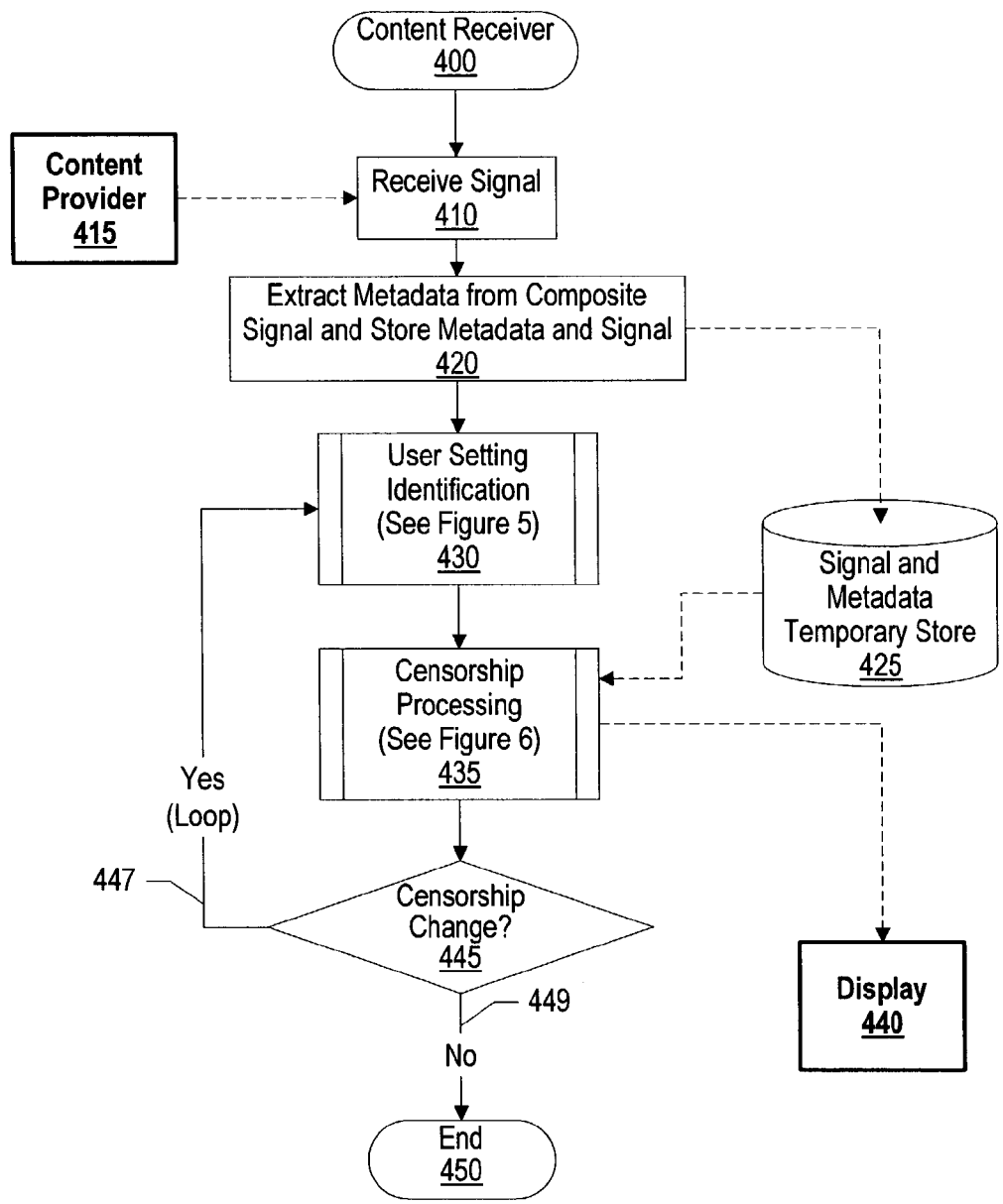
FIG. 4A is a high-level flowchart showing steps taken in a content receiver using metadata and control settings to process a media signal.

FIG. 4A is a high-level flowchart showing steps taken in a content receiver using metadata and control settings to process a media signal. Processing commences at 400, whereupon processing receives a signal from content provider 415 at step 410. In one embodiment, the signal may be a composite signal that includes a media signal and metadata (see FIG. 1 and corresponding text for further details regarding composite signal properties). In another embodiment, processing may receive a media signal from content provider 415 and metadata corresponding to the media signal from another source, such as an Internet metadata provider.

Processing separates the media signal from the metadata and stores them both in data store 425 (step 420). Data store 425 may be stored on a non-volatile storage area, such as a computer hard drive. In one embodiment, processing may process the media signal and the metadata in "real-time" in which case data store 425 may be stored in a fast memory area, such as internal memory.

Figure 5:
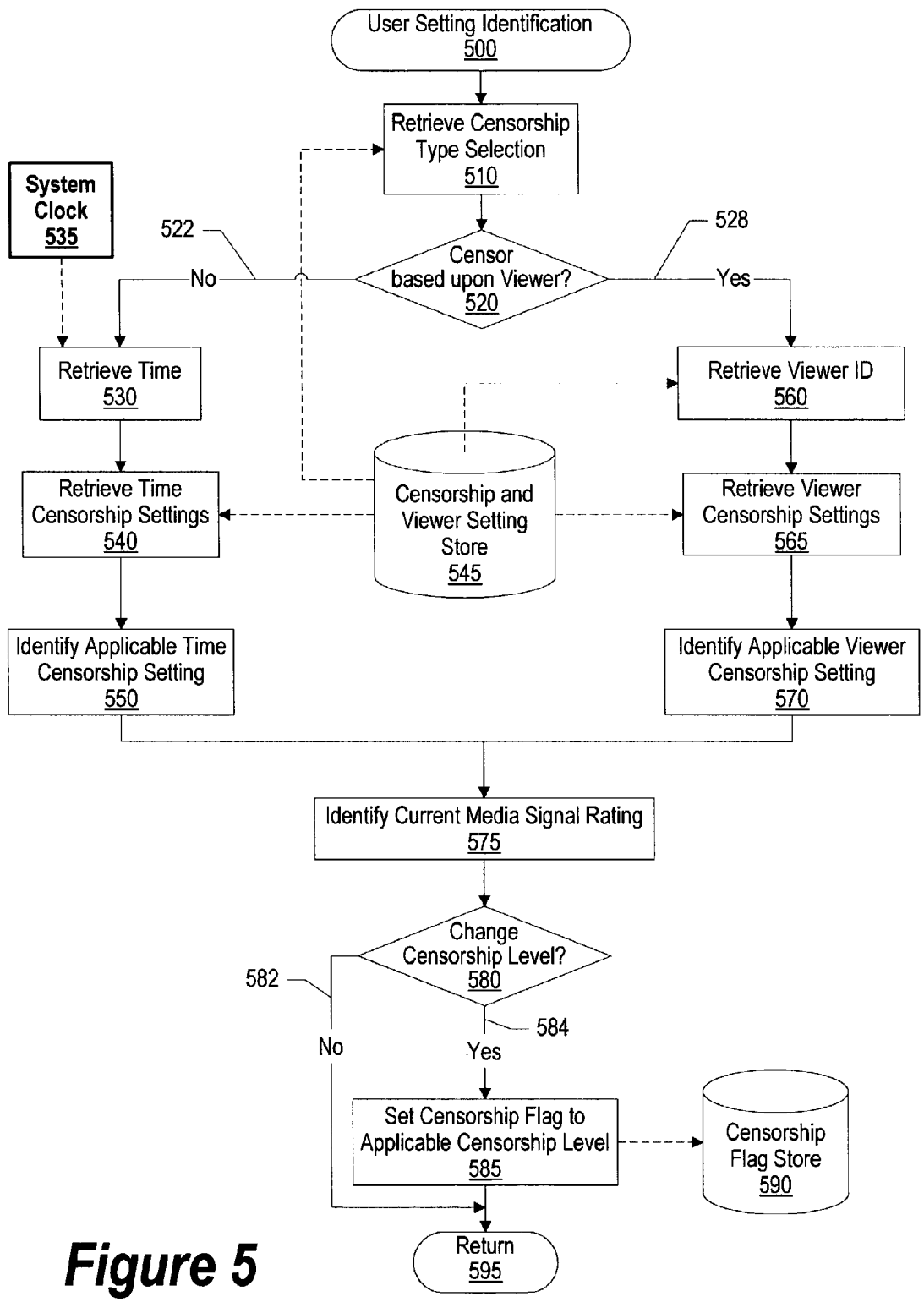
FIG. 5 is a flowchart showing steps taken in identifying an applicable censorship level using stored control settings.

Processing identifies an applicable censorship level using control settings that are stored in memory (pre-defined process block 430, see FIG. 5 and corresponding text for further details regarding applicable censorship level identification). For example, a parent may configure censorship level settings at "TV-G" during daylight hours and "TV-MA" during evening hours. In this example, processing identifies an applicable censorship level based upon the current time-of-day.

Figure 6:
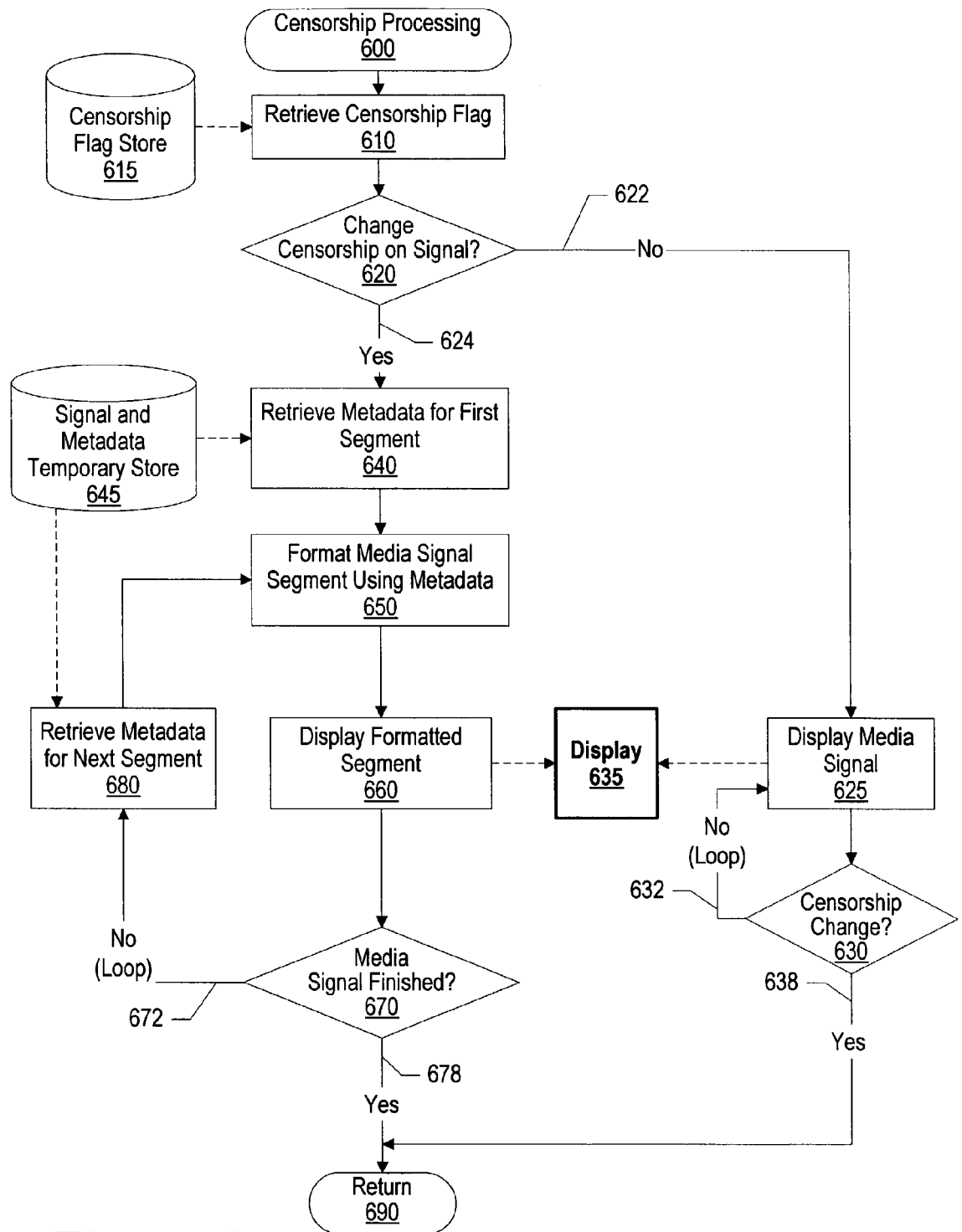
FIG. 6 is a flowchart showing steps taken in processing a media signal using metadata.

Processing uses the metadata to de-scramble the media signal to a censorship level corresponding to the applicable censorship level (pre-defined process block 435, see FIG. 6 and corresponding text for further details regarding media signal formatting). Processing displays the media signal on display 440.

A determination is made as to whether an event occurs to change the applicable censorship level (decision 445). Using the example described above, the time-of-day may have changed from "daylight hours" to "evening hours" whereby the censorship level changes from "TV-G" to "TV-MA". If a censorship level change occurred, decision 445 branches to "Yes" branch 447 which loops back to process the censorship level change. This looping continues until there are no more censorship level changes to process (i.e. the television is turned off), at which point decision 445 branches to "No" branch 449 and processing ends at 450.

Figure 4B:
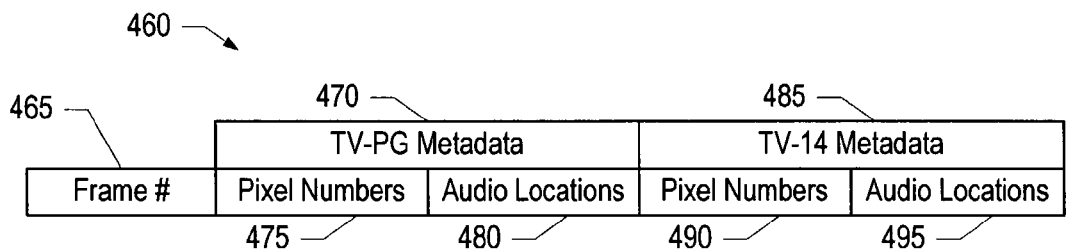
FIG. 4B is a diagram showing censorship level data included in metadata.

FIG. 4B is a diagram showing censorship level data included in metadata. A media signal is divided into segments whereby a segment may correspond to a single media signal frame (i.e. snapshot) or may correspond to a plurality of media signal frames, such as when a video portion is being "covered" (i.e. five seconds worth of a media signal). Metadata tag 460 includes segment number 465 and two corresponding censorship levels of metadata which are TV-PG 470 and TV-14 485. Segment number 465 includes a segment number corresponding to a media signal. For example, segment number 465 may include "800" which corresponds to the "$800^{th}$" segment in the media signal. TV-PG 470 includes censorship information to format the media signal to meet a censorship level rating "TV-PG". TV-PG 470 includes pixel numbers 475 and audio locations 480 which correspond to locations to censor the media signal at segment number 465 in order to meet a censorship level rating "TV-PG". Using the example described above, pixel numbers 475 includes display areas on segment number "800" that should be de-scrambled and audio locations 480 includes audio areas corresponding to segment number "800" that should be "un-bleeped" in order to meet a censorship level "TV-PG".

TV-14 485 includes censorship information to format the media signal to meet a censorship level rating "TV-14". TV-14 485 includes pixel numbers 490 and audio locations 495 which correspond to locations to censor the media signal at segment number 465 in order to meet a censorship level rating "TV-14". Using the example described above, pixel numbers 490 includes display areas on segment number "800" that should be de-scrambled and audio locations 495 includes audio areas corresponding to segment number "800" that should be "un-bleeped" in order to meet a censorship level "TV-14". Censorship information for other censorship levels (e.g. TV-MA) may be included in metadata tag 460 if applicable. For example, if the media signal includes portions that are rated "TV-MA", metadata tag 460 includes "TV-MA" metadata that may be used to descramble the media signal.

FIG. 5 is a flowchart showing steps taken in identifying an applicable censorship level using stored control settings. Processing commences at 500, whereupon processing retrieves a censorship type selection from data store 545 (step 510). The censorship type selection was chosen by a user, such as a parent, and may be either a time censorship selection or a viewer censorship selection (see FIG. 2 and corresponding text for further details regarding censorship type selection).

A determination is made using the censorship type selection as to whether to censor media signals based upon a viewer (i.e. viewer censorship selection) or based upon a time-of-day (time censorship selection) (decision 520). If processing should censor media signals based upon a time-of-day, decision 520 branches to "No" branch 522 whereupon processing retrieves a current time from system clock 535 at step 530. System clock 535 is a device that is capable of tracking the time-of-day, such as a timer. Time information is also included with the media signal provided by a satellite or cable television provider.

Processing retrieves time censorship settings from data store 545 at step 540. The time censorship settings correspond to various blocks of time. For example, a parent may wish to configure a content receiver to show "TV-G" rated media signals while his children are awake, and show "TV-MA" rated media signals while his children are asleep (see FIG. 2 and corresponding text for further details regarding time censorship settings). Processing identifies an applicable censorship level using the time acquired from system clock 535 and the retrieved time censorship settings (step 550). Using the example described above, the time-of-day may be 9 PM and processing identifies that the applicable censorship level is "TV-MA".

Processing identifies a media signal's censorship rating at step 575. For example, a media signal may be a television program with a censorship rating of "TV-PG". A determination is made as to whether to change the censorship level of the media signal by comparing the media signal's censorship rating with the identified applicable censorship level (decision 580). If the media signal's censorship rating and the identified applicable censorship level are different, decision 580 branches to "Yes" branch 584 whereupon processing sets a censorship flag at a level corresponding to the applicable censorship level, and stores the censorship flag value in censorship flag store 590 (step 585). For example, the censorship flag may have six levels wherein each level corresponds to each television rating level. On the other hand, if the media signal's censorship rating and the identified applicable censorship level are identical, decision 580 branches to "No" branch 582 bypassing censorship flag setting steps.

If processing should censor media signals based upon a viewer, decision 520 branches to "Yes" branch 528 whereupon processing retrieves a viewer identifier from data store 545 at step 560. Viewer identifiers are configured using a parental control user interface window and may have a corresponding personal identification number (PIN) that is used to authenticate the viewer. For example, the viewer may have used a remote control to select his name from a list of viewers and enter his PIN when he turns on the television.

Processing retrieves viewer censorship settings from data store 545 (step 565). The viewer censorship settings correspond to particular viewers. For example, a parent may wish to censor media signals at a "TV-G" rating for his five year old son "Billy", and censor media signals at a "TV-PG" rating for his teenage daughter "Sue" (see FIG. 2 and corresponding text for further details regarding viewer censorship settings). Processing identifies an applicable censorship level using the viewer identifier and the retrieved viewer censorship settings (step 570). Using the example described above, the viewer may be "Sue" and processing identifies the applicable censorship level is "TV-PG". Processing proceeds through decision 580 and step 585 as described above, and processing returns at 595.

FIG. 6 is a flowchart showing steps taken in processing a media signal using metadata. Processing commences at 600, whereupon processing retrieves a censorship flag from censorship flag store 615 (step 610). The censorship flag is set when processing compares a media signal's censorship rating with an identified applicable censorship level (see FIG. 5 and corresponding text for further details regarding censorship flag setting steps). A determination is made as to whether processing should de-scramble the media signal in order to change the media signal's censorship level (decision 620). For example, the media signal's censorship rating may be "TV-PG" and the applicable censorship level may be "TV-14".

If the media signal's censorship level requires changing, decision 620 branches to "Yes" branch 624 whereupon processing retrieves metadata for the media signal's first segment at step 640. The segment may include a single media frame or may include a plurality of media frames, such as ten seconds worth of media. Processing formats the media signal segment using the metadata at step 650, and displays a formatted media signal segment on display 635 (step 660). Using the example described above, processing descrambles (i.e. "unbleeps" audio and "uncovers" video) portions of the media signal to format the media signal segment to a "TV-14" censorship level.

A determination is made as to whether the media signal (i.e. television program) is finished (decision 670). If the media signal is not finished, decision 670 branches to "No" branch 672 whereupon processing loops back to retrieve (step 680) and process metadata corresponding to the next media signal segment. This looping continues until the media signal is finished, at which point decision 670 branches to "Yes" branch 678 and processing returns at 690.

If the media signal's censorship level does not require changing, decision 620 branches to "No" branch 622 whereupon processing displays the media signal on display 635 (step 625). For example, if the media signal is rated "TV-PG" and the applicable censorship level is "TV-PG", processing displays the media signal "as-is". A determination is made as to whether a censorship change has occurred (decision 630). In one embodiment, processing makes this determination when a specific event occurs. For example, a censorship change may occur when a new television program starts, when a new viewer logs in, or when a time-of-day change occurs (see FIG. 2 and corresponding text for further details regarding censorship type selections). If a censorship change did not occur, decision 630 branches to "No" branch 632 which loops back to continue displaying the media signal on display 635. This looping continues until the censorship change occurs, at which point decision 630 branches to "Yes" branch 638 whereupon processing returns at 690 to process the censorship change.

Figure 7:
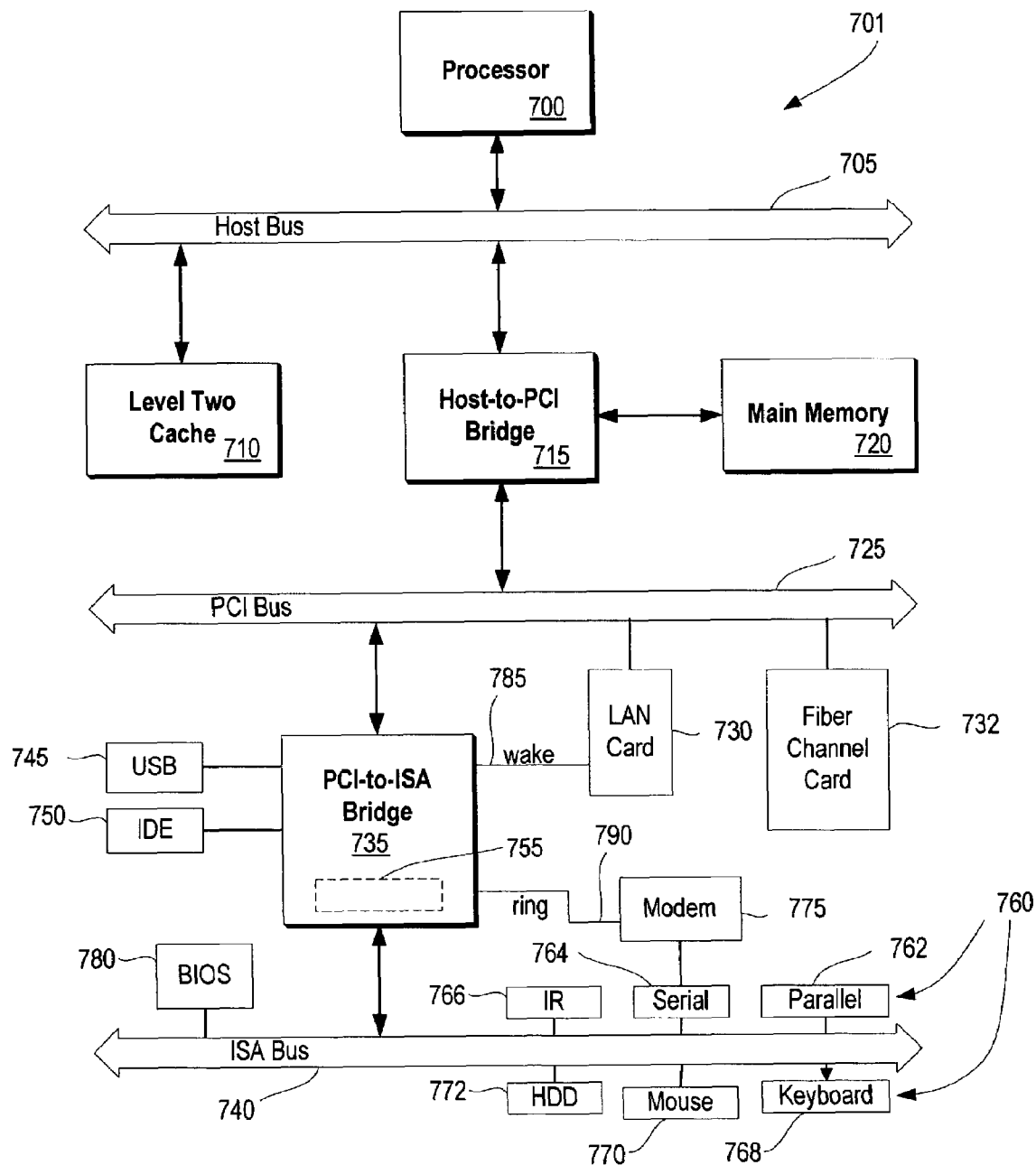
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of user-controlled censoring of a media signal, said method comprising:

receiving the media signal for a single television program, the media signal including first censorship level data and second censorship level data, the first censorship level data including a first set of pixel numbers for a specific frame included in the single television program and the second censorship level data including a second set of pixel numbers for the specific frame included in the single television program, wherein the first set of pixel numbers are different than the second set of pixel numbers;

retrieving control settings from a storage area;

identifying an applicable censorship level using the retrieved control settings;

selecting either the first censorship level data or the second censorship level data based upon the identified applicable censorship level;

in response to selecting the first censorship level data, selecting the first set of pixel numbers and de-scrambling pixels within the specific frame that correspond to the first set of pixel numbers;

in response to selecting the second censorship level data, selecting the second set of pixel numbers and de-scrambling pixels within the specific frame that correspond to the second set of pixel numbers; and displaying the frame with the de-scrambled pixels.

2. The method as described in claim 1 wherein the control settings are configured prior to receiving the media signal, the configuring further comprising:

receiving a user request;

authenticating the user request;

receiving the control settings in response to the authentication; and storing the control settings in the storage area.

* * * * *